US012133608B2

United States Patent
Tietz et al.

(10) Patent No.: US 12,133,608 B2
(45) Date of Patent: Nov. 5, 2024

(54) METHOD FOR OPERATING A HEATING SYSTEM AND KITCHEN MACHINE

(71) Applicant: Vorwerk & Co. Interholding GmbH, Wuppertal (DE)

(72) Inventors: Sebastian Tietz, Leverkusen (DE); Stefan Kraut-Reinkober, Leverkusen (DE); Kevin Schmitz, Haan (DE); Torsten Lang, Solingen (DE); Martin Weber, Wuppertal (DE); Maria Diel, Leichlingen (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 454 days.

(21) Appl. No.: 17/069,326

(22) Filed: Oct. 13, 2020

(65) Prior Publication Data

US 2021/0106171 A1    Apr. 15, 2021

(30) Foreign Application Priority Data

Oct. 15, 2019 (EP) .................................... 19203209

(51) Int. Cl.
| | |
|---|---|
| *A47J 36/32* | (2006.01) |
| *A47J 27/00* | (2006.01) |
| *H05B 1/02* | (2006.01) |
| *H05B 3/68* | (2006.01) |
| *G01K 7/18* | (2006.01) |

(52) U.S. Cl.
CPC .............. *A47J 36/32* (2013.01); *A47J 27/004* (2013.01); *H05B 1/0261* (2013.01); *H05B 3/68* (2013.01); *G01K 7/18* (2013.01); *H05B 2203/019* (2013.01); *H05B 2203/02* (2013.01); *H05B 2213/07* (2013.01)

(58) Field of Classification Search
CPC ....... A47J 36/32; A47J 27/004; H05B 1/0261; H05B 3/68; H05B 2213/07
See application file for complete search history.

(56) References Cited

U.S. PATENT DOCUMENTS

| | | | |
|---|---|---|---|
| 3,246,122 A * | 4/1966 | Wetzel | F24C 15/105 219/464.1 |
| 3,788,190 A | 1/1974 | Dunn | |
| 3,789,190 A | 1/1974 | Orosy et al. | |
| 5,300,757 A | 4/1994 | Hara et al. | |
| 6,640,692 B1 | 11/2003 | Hilgers et al. | |
| 8,319,687 B2 | 11/2012 | Kahle | |

(Continued)

FOREIGN PATENT DOCUMENTS

| | | |
|---|---|---|
| CN | 101080962 A | 11/2007 |
| CN | 101243848 A | 8/2008 |

(Continued)

*Primary Examiner* — Steven N Leff
(74) *Attorney, Agent, or Firm* — Jason H. Vick; Womble Bond Dickinson (US) LLP

(57) ABSTRACT

A method for operating an electric heating system of a kitchen machine and a kitchen machine for carrying out the method are proposed, wherein a measuring temperature of the heating system is determined by means of a temperature element in order to carry out a calibration of a heating element and/or to compare the measuring temperature with a heating temperature of the heating element determined by means of the heating element for identifying a critical heating state.

18 Claims, 7 Drawing Sheets

(56) References Cited

U.S. PATENT DOCUMENTS

| | | | |
|---|---|---|---|
| 9,109,960 B2* | 8/2015 | Sladecek | G01K 7/42 |
| 10,874,256 B2 | 12/2020 | Kraut-Reinkober et al. | |
| 11,510,285 B2 | 11/2022 | Spitthover et al. | |
| 2009/0146623 A1 | 6/2009 | de Cremoux | |
| 2010/0018963 A1* | 1/2010 | Rosenbauer | H02H 5/042 |
| | | | 219/488 |
| 2011/0284520 A1 | 11/2011 | Fong | |
| 2012/0234825 A1 | 9/2012 | Wang et al. | |
| 2015/0164281 A1 | 6/2015 | Koetz et al. | |
| 2017/0367515 A1* | 12/2017 | Cornelissen | A47J 27/004 |
| 2018/0008089 A1 | 1/2018 | Jiang | |
| 2018/0177340 A1 | 6/2018 | Kraut-Reinkober et al. | |
| 2018/0360272 A1 | 12/2018 | Kvesic et al. | |
| 2019/0223258 A1 | 7/2019 | Spitthöver et al. | |

FOREIGN PATENT DOCUMENTS

| | | | | |
|---|---|---|---|---|
| CN | 102160453 A | 8/2011 | | |
| CN | 102160456 A | 8/2011 | | |
| CN | 102345495 A | 2/2012 | | |
| CN | 102362791 A | 2/2012 | | |
| CN | 103828483 A | 5/2014 | | |
| CN | 104470010 A | 3/2015 | | |
| CN | 104519774 A | 4/2015 | | |
| CN | 107145182 A | 9/2017 | | |
| CN | 108236351 A | 7/2018 | | |
| CN | 108884734 A | 11/2018 | | |
| CN | 110049581 A | 7/2019 | | |
| DE | 202006020208 U1 | 1/2008 | | |
| DE | 102010037739 A1 | 6/2011 | | |
| DE | 102010037769 A1 | 3/2012 | | |
| DE | 102015101299 A1 | 8/2016 | | |
| EP | 3338598 A2 | 6/2018 | | |
| EP | 3513698 A1 | 7/2019 | | |
| KR | 100784314 B1 | 12/2007 | | |
| WO | WO 2008/046852 A1 | 4/2008 | | |
| WO | WO-2010008279 A1 * | 1/2010 | ........... | H05B 1/0294 |
| WO | WO 2017/151966 A1 | 9/2017 | | |

* cited by examiner

METHOD FOR OPERATING A HEATING SYSTEM AND KITCHEN MACHINE

CROSS REFERENCE TO RELATED APPLICATIONS

This application claims the benefit under 35 U.S.C. 119(a) to European Patent Application No. 19 203 209.2, filed Oct. 15, 2019, the disclosure of which is incorporated herein by reference in its entirety.

BACKGROUND OF THE INVENTION

Field of the Invention

The present invention relates to a method for operating a heating system of a kitchen machine and a kitchen machine for preparing food.

Description of Related Art

It is known in electrically operated kitchen machines to heat food/ingredients in a vessel by means of an electrical heating system for the preparation of dishes/meals, wherein a (target) temperature of the heating system is specified as a command variable/set point and a temperature is measured as a controlled variable in order to (feedback) control the heating system.

When the food is heated, inhomogeneities of the food or an inclined position of the kitchen machine, for example, can lead to locally different heat transfer processes from the heating system to the food and thus to local temperature changes. Strong local temperature increases, so-called hotspots, can not only scorch/burn the food and thus impair the cooking result, but also damage the kitchen machine.

Against this background, European Patent Application EP 3 513 698 A1 discloses a method for operating a heating system of a kitchen machine, in which the electrical resistance of a heating element of the heating system is determined in order to identify a local temperature change of the heating element.

SUMMARY OF THE INVENTION

Object of the present invention is to provide an improved method for operating a heating system of a kitchen machine and an improved kitchen machine for the preparation of food, which enables or supports a safer preparation of food and/or a more precise and/or more reliable identification of critical heating states and/or local temperature changes.

The problem underlying the invention is solved by a method or a kitchen machine as disclosed herein.

The proposed kitchen machine is an electrically operated, in particular multifunctional, apparatus for preparing food/meals/dishes and/or for processing, in particular for heating, chopping and/or mixing, food/ingredients.

For this purpose, the proposed kitchen machine has an optional vessel for the food, an electric heating system for heating the food and/or a stirrer for stirring/mixing and/or chopping the food.

However, the kitchen machine may also be any other machine for processing, in particular heating, food, such as a cooker/stove, oven, microwave and/or toaster.

A food in the sense of the present invention is preferably a foodstuff, aliment, nutritional product, beverage, drink and/or a luxury food for consumption. Food may be, for example, products of plant origin, such as vegetables, fruit and/or a (dried) grain product, and/or products of animal origin, such as eggs, meat products and/or dairy products.

A food in the sense of the present invention can be solid, liquid, viscous, mushy, pasty or the like.

A food in the sense of the present invention can be an initial, intermediate and/or final product for consumption and/or for a meal and/or a dish. In particular, a food in the sense of the present invention can form an ingredient for a dish and/or a meal and/or itself be formed by a plurality of foodstuffs and/or itself be a dish and/or meal.

In the case of the proposed kitchen machine, the heating system is preferably at least partially integrated into the vessel, in particular a bottom of the vessel. However, it is also possible to arrange the heating system of the proposed kitchen machine in a separate apparatus, such as a base station, to heat the vessel.

The heating system of the proposed kitchen machine preferably comprises a heating plate, an electrical heating element/electrical conductor for generating heat energy and/or for heating the heating plate, a measuring device for determining the electrical resistance of the heating element and/or a temperature element for determining a measuring temperature, in particular of the heating plate and/or of the vessel.

The heating element is preferably designed as a heating resistor, particularly preferably as a thermistor, in particular as an NTC thermistor or PTC thermistor.

The electrical resistance, in the following called resistance for short, of the heating element is temperature-dependent and/or changes with a changing temperature of the heating element.

In the case of a PTC resistor/PTC thermistor, the resistance increases with increasing (average) temperature of the PTC resistor. A PTC resistor therefore has a positive temperature coefficient.

In the case of an NTC thermistor/NTC resistor, the resistance decreases with increasing (average) temperature of the NTC resistor. An NTC resistor therefore has a negative temperature coefficient.

It is therefore possible and provided for in the proposed method to determine the (average) temperature of the heating element, hereinafter referred to as the heating temperature, by (metrological) determination of the resistance of the heating element, in particular by means of a measuring device and/or to (feedback) control the heating system.

Due to manufacturing tolerances, the dependence between resistance and temperature is device-specific. For this reason, the dependence is preferably to be determined individually for each heating system and/or each kitchen machine by means of a calibration. In addition, the dependence can change over time, for example due to device wear, so that a recalibration/new calibration is necessary in order to, based on the resistance, (feedback) control the heating system and/or reliably determine the heating temperature.

According to a first method variant of the proposed method, it is provided to determine, in addition to the heating temperature, a (local) measuring temperature of the heating system, in particular of the heating plate, by means of a (separate) temperature element in order to carry out a calibration of the heating system, in particular of the heating element, for determining the heating temperature by means of the electrical resistance.

According to the first method variant, a calibration of the heating system, in particular of the heating element, is carried out by means of the temperature element, preferably in order to subsequently—in particular exclusively and/or without using the temperature element—determine the heating temperature on the basis of the resistance of the heating element and/or to use the heating element as a resistance thermometer, in particular as a resistance thermometer measuring over an area and/or in an areal manner.

In the calibration, preferably a (first) electrical resistance value of the heating element/a (first) resistance reference value is assigned to a corresponding (first) heating temperature value of the heating element/a (first) heating temperature reference value, preferably the resistance value being determined by means of the measuring device and the heating temperature value being determined by means of the temperature element and/or a measuring temperature value of the temperature element.

Particularly preferably, in the calibration a plurality of (different) electrical resistance values of the heating element are assigned to corresponding heating temperature values of the heating element to determine a temperature coefficient of the heating element.

It is provided in particular to assign a (second) electrical resistance value of the heating element/a (second) resistance reference value to a corresponding (second) heating temperature value of the heating element/a (second) heating temperature reference value, preferably in order to determine the temperature coefficient by means of the value pairs.

In this way and/or by means of the resistance values and heating temperature values, it is possible to mathematically represent/establish the relationship and/or correlation between the electrical resistance of the heating element and the heating temperature and preferably to store it electronically—for example as a functional equation and/or a table—in a data memory of the kitchen machine.

The use of the temperature element thus enables easy calibration of the heating system and/or the kitchen machine, in particular on site and/or by a user and/or independently of additional (external) measuring devices. Furthermore, the calibration can be repeated multiple times, for example for each cooking process, and/or after a certain period of time.

The term "calibration" in the sense of the present invention is preferably to be understood as an (independent) method step in which one or more resistance values of the heating element, determined in particular by a measuring device, are assigned to one or more heating temperature values determined by the temperature element, in particular in order to subsequently—exclusively and/or without using the temperature element—use the resistance of the heating element for determining the heating temperature.

According to a second method variant, which can also be carried out independently, the measuring temperature determined by means of the temperature element is compared—in particular during heating operation and/or during use of the kitchen machine—with the heating temperature determined by means of the heating element—in particular automatically, continuously and/or at intervals—in order to identify a critical/unintended heating state and/or cooking state, in particular a local temperature change of the heating element.

In this way, a particularly precise and/or reliable identification of critical heating states and/or local temperature increases is made possible compared to the state of the art.

Namely, a local temperature increase can lead to a similar or identical change in the resistance of the heating element as a minor uniform temperature increase of the heating element, so that the heating temperature determined exclusively by means of the resistance does not allow reliable conclusions to be drawn about a local temperature change.

A critical/unintentional heating state and/or cooking state, hereinafter referred to as critical heating state, in the sense of the present invention is a state/condition of the heating system and/or the kitchen machine in which there is a local change in temperature, in particular an increase and/or decrease in temperature, of the heating element compared to the other/overall (average) temperature or temperature distribution of the heating element. For example, a critical heating state and/or a local temperature change is present if the temperature of the heating element at a spot/location deviates by more than 5° C., 10° C. or 30° C. compared to the immediate surroundings of the spot/location, in particular for a predefined period of time, for example more than 5 seconds or 10 seconds.

The identification of the critical heating state is preferably carried out on the basis of one or more predefined criteria in which the heating temperature and the measuring temperature are compared with each other—in particular automatically, mathematically, metrologically and/or directly or indirectly. In particular, there is a critical heating state if one or more criteria are met/fulfilled—particularly preferably simultaneously and/or over a predefined period of time.

In a first criterion (gradient criterion), the gradient of the heating temperature is preferably compared with the gradient of the measuring temperature in order to identify a critical heating state. In particular, the difference between the gradients of the heating temperature and the measuring temperature is formed and compared with a predefined limit value/threshold value/critical value, for example 2° C./s or 3° C./s.

If the gradient of the heating temperature is (clearly) above the gradient of the measuring temperature, for example by more than 2° C./s, and/or for a longer period of time, for example by more than 5 seconds, and/or if the predefined limit value is exceeded, the first criterion is fulfilled and/or a local temperature increase of the heating element is present, which is only detected by the heating element and/or is not or too late detected by the temperature element.

In a second criterion (difference criterion), the difference between the heating temperature and the measuring temperature is formed and compared with a predefined limit value/threshold value/critical value to identify a critical heating state.

If the difference between the heating temperature and the measuring temperature is above the defined limit value, for example 20° C., 40° C. or 60° C.,—in particular for a longer period of time, for example more than 5 seconds—the second criterion is met/fulfilled and/or a local temperature increase of the heating element is present.

In a third criterion (absolute temperature criterion), the heating temperature and/or the measuring temperature is/are (each) compared with a (respective) predefined limit value/threshold value/critical value, for example 150° C., 200° C. or 240° C., in order to determine a critical heating state. The third criterion can in particular also be used to check the two criteria mentioned above.

In principle, the above criteria can be used independently of each other or in any combination to identify a critical heating state.

According to a method variant, the criterion/criteria, in particular the sensitivity of the criteria, and/or the limit value(s) is/are adapted recipe-specifically, in particular depending on the foods and/or classes of foods to be prepared and/or the mode of operation of the heating system and/or kitchen machine. For example, in a recipe requiring a high heat output, the difference between the gradients of the measuring temperature and the heating temperature and/or the difference between the measuring temperature and the heating temperature may be greater than in recipes requiring a lower heat output, without one or more criteria being considered as fulfilled and/or without this being identified as a critical heating state. Consequently, the limit values can be (automatically) adjusted in such a recipe.

According to a further, particularly preferred and also independently realizable method variant, a first measuring temperature of the heating system is determined by means of a first temperature element and a second measuring temperature of the heating system is determined by means of a second (separate) temperature element in order to compare the heating temperature with several measuring temperatures and/or the first and the second measuring temperature for the identification of the critical heating state. In this way, it is possible to (also) identify a local temperature change which occurs in the immediate vicinity of one of the temperature elements and thus cannot be identified by comparing the heating temperature with the measuring temperature of the temperature element concerned.

In the proposed method, the operation of the kitchen machine, in particular the heating system, may be (automatically) adjusted at/upon or (immediately) after identification of the critical heating state, in particular in order to prevent the local temperature change identified in this way from having a negative effect on the operation of the kitchen machine and/or the preparation of the food.

Preferably at/upon or (immediately) after identification of the critical heating state, a stirring process by means of the stirrer and/or a heating process by means of the heating system may be carried out, started, stopped and/or adapted/adjusted.

For example, when the critical heating state is identified, it is possible to activate the stirrer of the kitchen machine to homogenize the temperatures and thus to carry out the stirring process.

In addition or alternatively, the heat output of the heating system may be reduced or heating by means of the heating system may be interrupted.

In this way, at/upon or (immediately) after identification of the critical heating state, measures are taken, in particular automatically, to prevent damage to the food and/or the kitchen machine.

Preferably, it is automatically checked/verified whether the measures taken and/or the adjustment of the operation of the kitchen machine, in particular the heating system, has been successful, i.e. has led to a homogenization of the temperatures.

Consequently, is is provided in the proposed method to carry out a validation and/or plausibility check of the measures taken and, depending on the result, to adapt the criteria and/or limit values and/or measures.

If, for example, the heating temperature and the measuring temperature do not approach each other due to a stirring process, there may be a false alarm, for example, by incorrect calibration and/or criteria that are too sensitive. In this case a recalibration/new calibration can be (automatically) carried out.

Additionally or alternatively, it is possible to correct the limit values and/or criteria accordingly to reduce the sensitivity. It is also possible to ignore and/or switch off the comparison of the heating temperature and the measuring temperature for the current preparation process.

If the approximation of the heating temperature and the measuring temperature is too slow, one or more measures may be adapted and/or combined with each other. For example, the heat output can be reduced to a greater extent, the stirring process can be carried out longer and/or at a higher rotational speed and/or an additional measure can be taken.

If, on the other hand, the approximation of the heating temperature and the measuring temperature is too fast, the heat output can be reduced to a lesser extent, the stirring process can be carried out for a shorter time and/or at a lower rotational speed and/or a measure can be omitted completely.

According to a further aspect of the present invention, which can also be realized independently, a measuring temperature determined by means of a temperature element of a heating system and a heating temperature determined by means of a heating element of the heating system, in particular a PTC thermistor, are used to identify a critical heating state of the heating system, in which the heating element of the heating system exhibits a local temperature change. In this way, corresponding advantages are realized.

The above-mentioned aspects, features, method steps and method variants of the invention as well as the aspects, features, method steps and method variants of the present invention resulting from the claims and the following description can in principle be realized independently of each other, but also in any combination and/or sequence.

Further aspects, advantages, features and properties/characteristics of the present invention result from the claims and the following description of a preferred embodiment with reference to the accompanying drawings.

DETAILED DESCRIPTION OF THE INVENTION

In the figures, some of which are not to scale and are only schematic, the same reference signs are used for the same, identical or similar parts and components, wherein corresponding or comparable properties and advantages are achieved, even if no repeated description is given.

Figure 1:
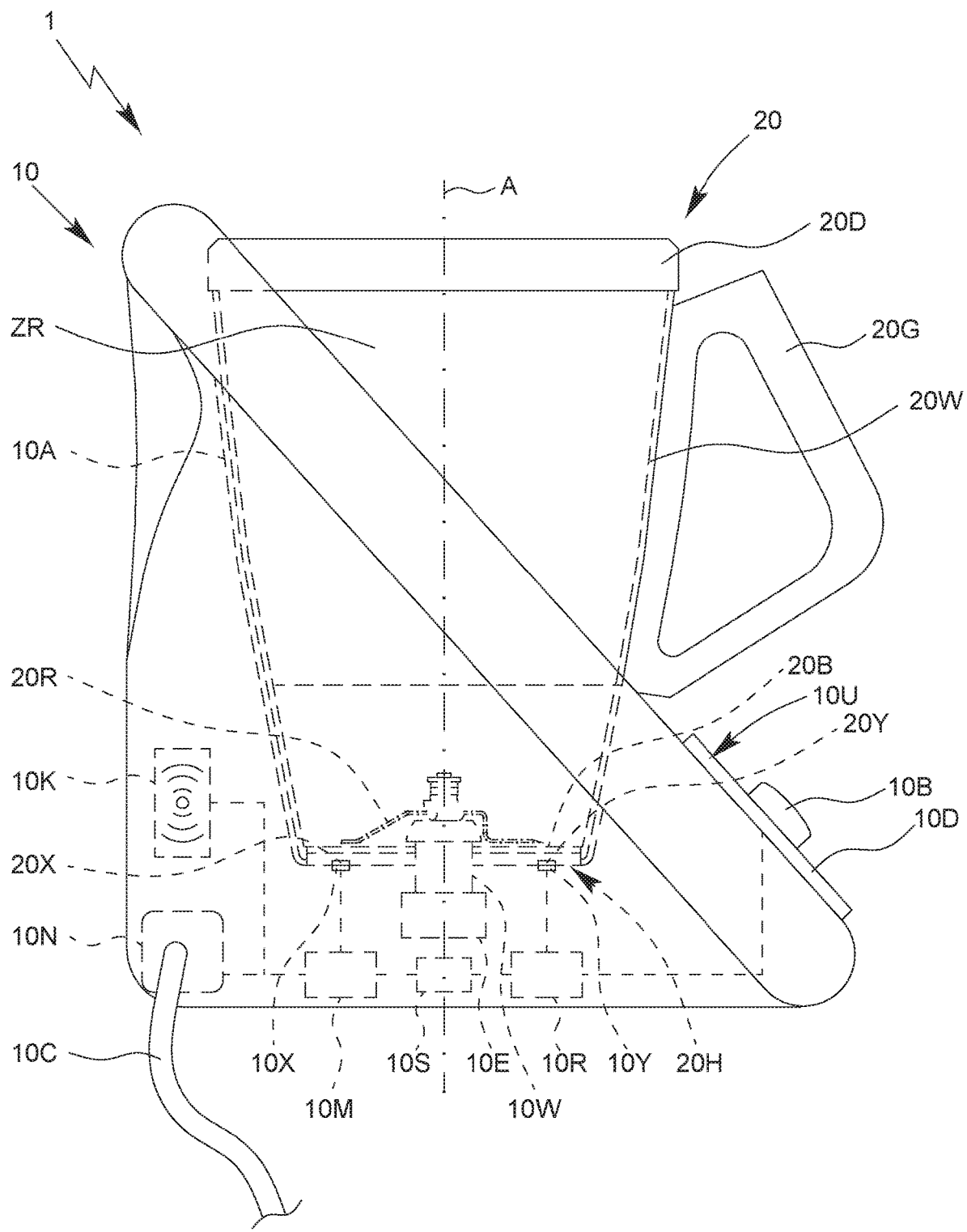
FIG. 1 is a schematic side view of a proposed kitchen machine with a proposed heating system for heating a preparation chamber.

FIG. 1 schematically shows a proposed food processor/kitchen machine 1 for the preparation of food/meals/dishes and/or for the processing of food/ingredients. The kitchen machine 1 is preferably an electrically operated multi-functional kitchen machine/food processor designed for chopping, stirring/mixing and/or heating/cooking food.

The kitchen machine 1 preferably has a base station 10 and/or a vessel/container 20 to receive/hold food.

The base station 10 and the vessel 20 are preferably connected or connectable electrically and/or mechanically, in particular to allow heating and/or mixing/stirring of the food in the vessel 20. In addition, solutions are also possible in which the base station 10 and the vessel 20 are additionally fluidically connected or connectable, for example in order to conduct water vapor generated in the base station 10 into the vessel 20.

FIG. 1 shows the kitchen machine 1 in its usual state of use and/or in the connection position in which the vessel 20 is electrically and/or mechanically connected to the base station 10.

The base station 10 preferably has a receptacle 10A to receive/accommodate the vessel 20 at least partially and/or at the bottom. Particularly preferably, the vessel 20 is at least partially insertable or suspendable in the base station 10 in order to connect the vessel 20 mechanically and/or electrically to the base station 10.

The vessel 20 has a wall 20W, a bottom 20B and a preparation chamber ZR, the wall 20W delimiting the preparation chamber ZR radially/laterally and the bottom 20B delimiting the preparation chamber ZR axially/from below.

The vessel 20 preferably has a lid 20D in order to delimit the preparation chamber ZR axially/from above and/or, in particular, to close it pressure-safe.

Optionally, the vessel 20 is equipped with a handle 20G to simplify the handling of the vessel 20.

In the embodiment shown, the vessel 20 is at least essentially round and/or cylindrical in shape. However, in principle, embodiments are also possible in which the vessel 20 is angular, in particular rectangular.

The vessel 20 has a central axis A, with the central axis A passing centrally through the vessel 20 and/or preparation chamber ZR, as indicated in FIG. 1.

Preferably the central axis A is a longitudinal or symmetry axis of the preferably elongated, cylindrical and/or at least substantially rotationally symmetrical vessel 20.

Optionally, the vessel 20 is equipped with a stirrer 20R, in particular for chopping and/or mixing food in the preparation chamber ZR. The stirrer 20R is preferably rotatably mounted and/or located at the bottom 20B of vessel 20. The stirrer 20R preferably has a plurality of, in particular exchangeable, stirring paddles/blades.

Preferably, the stirring blades have cutting edges or are designed as cutting blades to chop up food.

Preferably, the central axis A of the vessel 20 corresponds to the axis of rotation of the stirrer 20R.

Preferably, the vessel 20 is mechanically connected or connectable to the base station 10 to drive the stirrer 20R by means of the base station 10.

To drive the stirrer 20R, the kitchen machine 1, in particular the base station 10, has an electric motor 10E, which is connected or connectable to the stirrer 20R via a shaft 10W and/or—in the connection position—engages positively/form-fittingly in the bottom 20B from below.

As already explained at the beginning, the kitchen machine 1 is designed to heat food and/or a medium in the vessel 20 and/or in the preparation chamber ZR.

For this purpose, the vessel 20 and/or preparation chamber ZR is electrically heatable and/or the kitchen machine 1 has an electric heating system 20H.

The heating system 20H is designed for (direct) heating of the vessel 20, in particular the bottom 20B and/or the preparation chamber ZR. Particularly preferably, the heating system 20H is designed as a thick-film heater.

In the embodiment shown, the heating system 20H is integrated into the vessel 20, in particular the bottom 20B, and/or the heating system 20H or part of the heating system 20H forms the bottom 20B of the vessel 20 or part thereof. However, constructive solutions are also possible in which the base station 10 has or forms the heating system 20H.

In order to enable a power supply to the base station 10 and/or the vessel 20, in particular the heating system 20H and/or the electric motor 10E, the kitchen machine 1, in particular the base station 10, is equipped with a power supply unit 10N—preferably with appropriate charging electronics—and/or a power cord 10C for connection to a mains supply.

Preferably, the base station 10 has one or more electrical connections 10X and/or 10Y for the vessel 20, in order to connect the vessel 20—in the connection position—electrically with the base station 10 and/or the power supply unit 10N and/or to supply it with electrical energy/power.

The electrical connection(s) 10X and/or 10Y are/is preferably integrated into the receptacle 10A of the base station 10, in particular in such a way that by inserting the vessel 20 into the base station 10, an electrical connection is automatically established between the vessel 20 and the base station 10.

The vessel 20 preferably has one or more electrical connections 20X and/or 20Y corresponding to the electrical connection 10X and/or 10Y, preferably wherein the electrical connection 20X and/or 20Y are/is located on an underside of the vessel 20 and/or the bottom 20B, as indicated in FIG. 1.

The electrical connections 10X/10Y and 20X/20Y are preferably formed by one or more electrical contacts or—in particular for wireless power transmission—by one or more coils.

The kitchen machine 1, in particular the base station 10, preferably has a user interface 10U, a data processing device 10R, a control device 10S, a communication device 10K and/or a measuring device 10M, preferably wherein the user interface 10U, the data processing device 10R, the control device 10S, the communication device 10K, the measuring device 10M, the power supply unit 10N, the heating system 20H, the electric motor 10E and/or the connections 10X, 10Y are electrically connected to each other, as indicated by dashed lines in FIG. 1.

The user interface 10U is formed by at least one display device 10D, such as a screen, and at least one input device 10B, in particular a control element, such as a rotary knob. Via the user interface 10U, a user of the kitchen machine 1 can interact with the kitchen machine 1 and/or take from and/or add to to the kitchen machine 1 one or more items of information, for example concerning the operation of the kitchen machine 1, the food to be prepared and/or the recipe to be used.

The data processing device 10R is preferably a device for evaluating, storing and/or processing one or more signals, data, measured values, reference values, information or the like. In particular, the data processing device 10R has a computing unit, such as a processor, and/or a (data) storage/memory, for example in the form of an SSD.

The control device 10S is preferably designed to control, in particular to activate or deactivate, the electric motor 10E and/or the stirrer 20R and/or the heating system 20H and/or to adjust the power of the electric motor 10E and/or the heating system 20H.

By means of the communication device 10K, the kitchen machine 1 can be coupled (in terms of data connection) with one or more (external) devices, in particular a mobile device, such as a mobile phone, and/or apparatuses, in particular a central apparatus, such as a server.

In particular, the communication device 10K enables a wired or wireless data connection between the kitchen machine 1 and one or more devices or one or more apparatuses in order to determine a signal and/or information, in particular concerning the operation of the kitchen machine 1, the food to be prepared and/or the recipe to be used, and/or to exchange it between the kitchen machine 1 and the device(s) and/or the apparatus(es), wherein the data exchange and/or the signal transmission can take place directly or indirectly.

A signal in the sense of the present invention is preferably a means of transmitting information, a (modulated) wave, a bit sequence, a packet in the information technological sense or the like. In particular, one or more pieces of information are assigned to a signal and/or contained in the signal, which are transmittable by means of the signal.

The communication device 10K preferably comprises a receiver for receiving a signal, a transmitter for transmitting a signal and/or an interface, in particular a radio interface, a WPAN interface, a near field communication interface, an NFC interface, a WLAN interface or another, particularly preferred wireless interface.

By means of the measuring device 10M, one or more measured variables, such as a temperature, a weight, an electrical voltage, an electrical current, an electrical resistance, a rotational speed, a pressure, an air humidity and/or an inclination of the kitchen machine 1, in particular of the base station 10 and/or the vessel 20, particularly preferably of the electric motor 10E and/or the heating system 20H, can be determined/measured (directly or indirectly). For this purpose, the measuring device 10M has one or more sensors and/or measuring units, such as a temperature sensor, a scale, a voltage measuring unit/voltmeter, a current measuring unit/ammeter, a rotational speed measuring unit/revolution counter, a pressure sensor, a humidity sensor and/or an inclination sensor.

In the following, the structural design of the heating system 20H is explained in more detail on the basis of FIG. 2. Afterwards the proposed method is explained on the basis of FIGS. 3 to 7.

Figure 2:
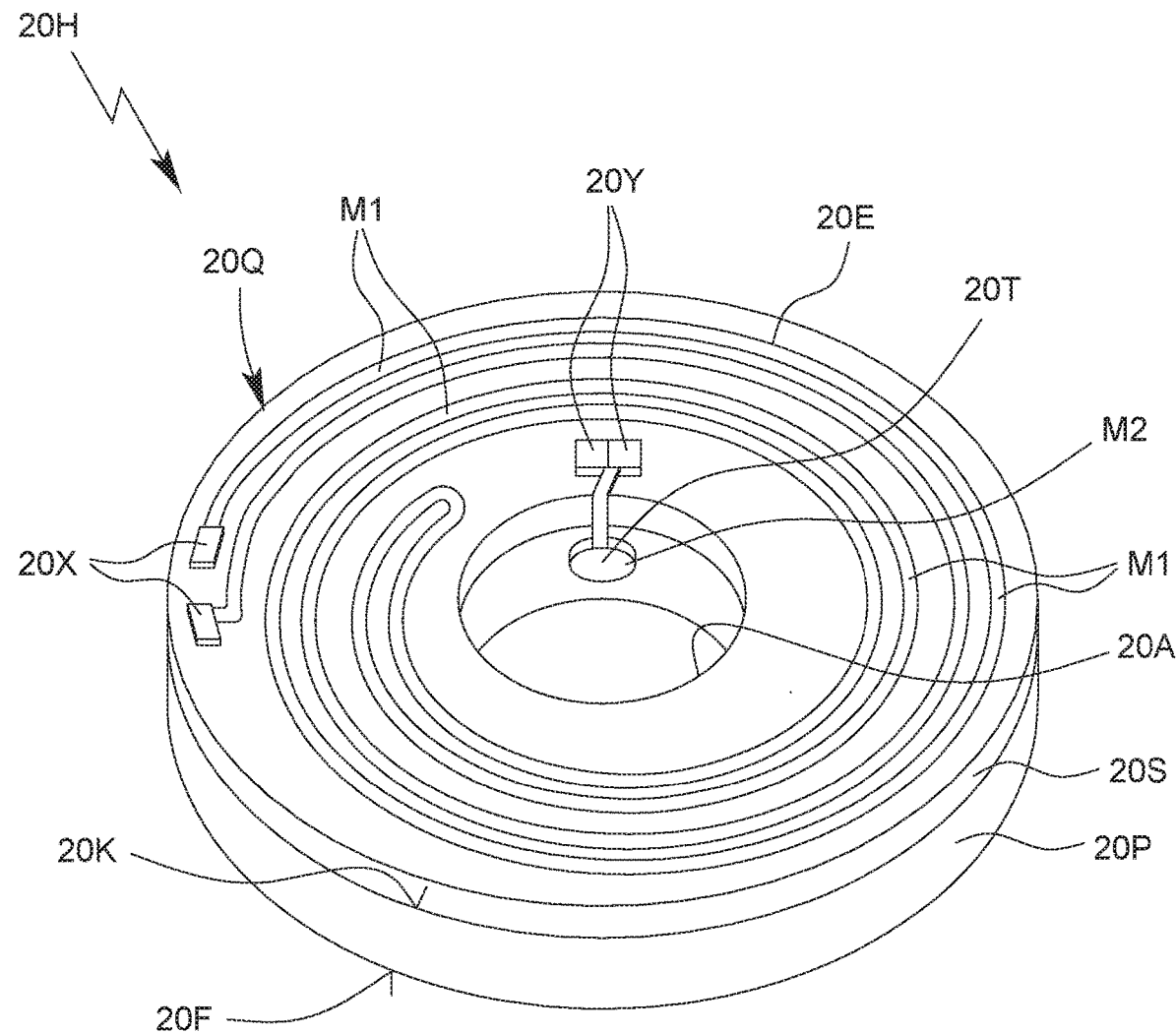
FIG. 2 is a perspective view of the heating system according to FIG. 1.

FIG. 2 shows the heating system 20H in a perspective view from below and/or from a side facing away from the preparation chamber ZR (not shown in FIG. 2).

The heating system 20H preferably comprises an electric heating device 20Q and/or a heating plate 20P, preferably wherein the heating device 20Q is designed for heat generation and/or for (uniform) heating of the heating plate 20P and/or the heating plate 20P is designed for (uniform) heat emission, in particular to the preparation chamber ZR or food located therein.

The heating system 20H is preferably designed flat and/or plate-like/disk-like, in particular to be able to integrate the heating system 20H into the bottom 20B of the vessel 20.

The heating system 20H, in particular the heating device 20Q and/or the heating plate 20P, is/are preferably of annular shape and/or circular disc shape and/or has/have an in particular central opening 20A to accommodate/receive at least partially the electric motor 10E, the shaft 10W and/or the stirrer 20R. In other words, the heating system 20H, in particular the heating device 20Q and/or the heating plate 20P, extends annularly around the electric motor 10E, the shaft 10W and/or the stirrer 20R.

The heating plate 20P is preferably designed as a heat exchanger and/or is designed to dissipate the heat generated by the heating device 20Q in particular to the preparation chamber ZR and/or to transfer it to a food in the vessel 20 and/or the preparation chamber ZR. For this purpose, the heating plate 20P is preferably made entirely or partially of metal, in particular copper, aluminium and/or stainless steel.

Preferably, the heating plate 20P delimits the preparation chamber ZR downwards and/or the heating plate 20P forms the bottom 20B of the vessel 20 or a part thereof. In particular, the heating plate 20P is in (direct) contact with the food during the preparation of the food.

The heating plate 20P is preferably arranged between the heating device 20Q and the preparation chamber ZR and/or separates the heating device 20Q from the preparation chamber ZR.

The heating plate 20P preferably has a heating surface 20F on a top side and/or a side facing the preparation chamber ZR and a contact surface 20K on a bottom side and/or a side facing away from the preparation chamber ZR, preferably wherein the heating plate 20P with the contact surface 20K rests with the entire area on the heating device 20Q.

The heating plate 20P can be designed with one or more layers.

Preferably, at least the layer/side of the heating plate 20P facing the preparation chamber ZR is food safe and/or made of stainless steel.

The heating system 20H, in particular the heating device 20Q, preferably comprises at least one heating element 20E and/or a carrier layer 20S, preferably wherein the heating element 20E is arranged on or in the carrier layer 20S and/or is electrically insulated from the heating plate 20P by the carrier layer 20S. In particular, the carrier layer 20S is made of an electrically insulating material, for example fibre-reinforced plastic, in order to electrically insulate the heating element 20E.

The heating element 20E is preferably designed as an electrical (elongated) conductor, particularly preferably as a thermistor, in particular as a PTC resistor/PTC thermistor. However, solutions are also possible in which the heating element 20E is designed as a NTC thermistor/NTC resistor.

Preferably, the heating element 20E converts electrical energy into thermal energy and/or the heating element 20E heats up, in particular to a heating temperature HT, when an electric current flows through it.

To supply the heating element 20E with electrical energy, the heating system 20H, in particular the heating device 20Q, has the electrical connection 20X, preferably wherein the electrical connection 20X is formed by two electrical contacts. However, embodiments are also possible in which the heating system 20H, in particular the heating device 20Q, is supplied with electrical energy by induction.

Preferably, the heating system 20H and/or the heating device 20Q, in particular the heating element 20E, is electrically connected or connectable to the measuring device 10M, the control device 10S, the data processing device 10R, the user interface 10U, the communication device 10K and/or the power supply unit 10N via the electrical connection 20X of the heating system 20H and the electrical connection 10X of the base station 10.

In the embodiment shown, the heating element 20E is formed spirally and/or is wound around the opening 20A. Here, however, other arrangements and/or windings are also possible, for example, in which the heating element 20E is meander-shaped.

Preferably, the heating element 20E extends in a plane, in particular wherein the plane formed by the heating element 20E is at least substantially parallel to the heating plate 20P, in particular the heating surface 20F and/or the contact surface 20K, and/or orthogonal to the central axis A of the vessel 20.

Preferably, the heating element 20E has or forms a first and/or areal, in the embodiment shown spiral-shaped, measuring location/area M1 for (direct or indirect) determination/measurement of the heating temperature HT. In particular, the (surface) area of the heating element 20E corresponds to the area of the first/areal measuring location M1.

Particularly preferably, the area of the heating element 20E and/or the first/areal measuring location M1 is at least 10%, 20% or 30% of the area of the heating plate 20P, in particular the heating surface 20F and/or the contact surface 20K.

As explained at the beginning, the electrical resistance R of the heating element 20E, in the following referred to as resistance R for short, varies with the heating temperature HT.

The heating temperature HT is preferably the temperature of the heating element 20E, in particular the mean/average temperature and/or the temperature averaged over the entire length/area of the heating element 20E and/or the areal temperature, and/or is preferably the temperature present at the first/areal measuring location M1.

Preferably, the resistance R of the heating element 20E increases with increasing heating temperature HT, especially preferably approximately according to the following linear equation:

$$R=R1[1+TCR(HT-HT1)],$$

with HT1 in [° C.] as first heating temperature value and/or reference heating temperature value at time t1, with R1 in [Ω] as first resistance value and/or reference resistance value at the first heating temperature value HT1 and/or at time t1 and with TCR in [1/° C.] as (positive) temperature coefficient and/or resistance increase value of the heating element 20E. Here, however, other, in particular non-linear equations can also be used to mathematically represent the relationship between the resistance R and the heating temperature HT.

Due to this dependency, the heating element 20E can be used as a resistance thermometer, measuring in particular over an area, and/or the heating temperature HT can be determined by means of the resistance R, preferably wherein the resistance R is determined by means of the measuring device 10M and/or by a current and voltage measurement.

Preferably, the first heating temperature value HT1, the first resistance value R1 and/or the temperature coefficient TCR are determined by calibrating the kitchen machine 1, in particular the heating system 20H, and/or are stored electronically in the data processing device 10R of the base station 10 and/or in a central apparatus such as a server.

The kitchen machine 1, in particular the heating system 20H, preferably has a temperature element 20T for determining a measuring temperature MT.

The temperature element 20T is preferably designed as a temperature sensor and/or thermometer, and particularly preferably as a (locally measuring) resistance thermometer, in particular an NTC sensor.

The temperature element 20T is preferably placed and/or fixed (directly) to the heating plate 20P. In the embodiment shown, the temperature element 20T is located in the opening 20A. However, other solutions are also possible, for example in which the temperature element 20T is arranged and/or fixed on or to the heating surface 20F, the wall 20W or the stirrer 20R.

The temperature element 20T is preferably electrically connected to the second electrical connection 20Y, preferably wherein the second electrical connection 20Y is located on a side of the heating system 20H and/or heating device 20Q facing away from the preparation chamber ZR and/or an underside of the heating system 20H and/or heating device 20Q.

Preferably, the temperature element 20T is electrically connected or connectable to the measuring device 10M, the control device 10S, the data processing device 10R, the user interface 10U, the communication device 10K and/or the power supply unit 10N via the electrical connection 20Y of the vessel 20 and the electrical connection 10Y of the base station 10.

The temperature element 20T is preferably designed exclusively for measuring the measuring temperature MT. However, the temperature element 20T can also be designed and/or used as (further) heating element. In particular, the temperature element 20T can be used additionally or alternatively, in particular as required, to generate heat.

The temperature element 20T preferably has or forms a second and/or local measuring location/area M2 for (direct or indirect) determination/measurement of the measuring temperature MT.

The measuring temperature MT is preferably the temperature determined by the temperature element 20T and/or at the measuring location M2. In particular, the measuring temperature MT is the (average) temperature of the heating plate 20P at the measuring location M2.

The heating element 20E and/or the first/areal measuring location M1 is preferably larger and/or has more (surface) area than the temperature element 20T and/or the second measuring location M2, preferably by at least five or ten times.

Preferably, the temperature element 20T and/or the second measuring location M2 is spaced from the heating element 20E and/or the first measuring location M1, particularly preferably radially and/or axially and/or by at least 0.5 cm or 1 cm.

Particularly preferably, the temperature element 20T and/or the second measuring location M2 is closer to the preparation chamber ZR than the heating element 20E and/or the first measuring location M1.

In particular due to the distance of the temperature element 20T and/or the second measuring location M2 from the heating element 20E and/or the first measuring location M1, the measuring temperature MT is lower than the heating temperature HT, in particular by at least 5° C. or 10° C.

In the following, the proposed method for operating and/or (feedback) controlling the kitchen machine 1 and/or the electric heating system 20H is described using FIGS. 3 to 7.

The proposed method is preferably carried out by and/or in the kitchen machine 1, in particular by means of the heating system 20H, the control device 10S, the measuring device 10M, the data processing device 10R and/or the electric motor 10E.

As explained above, critical heating conditions/states and/or local temperature changes of the heating system 20H, in particular the heating plate 20P and/or the heating element 20E, shall be identified/detected with the proposed method.

For this purpose, the measuring temperature MT and the heating temperature HT and/or the resistance R are determined and compared with each other, in particular by signal comparison and/or metrological means.

The method is preferably designed as a multi-stage and/or multi-step method. In particular, the method has several method steps.

Figure 3:
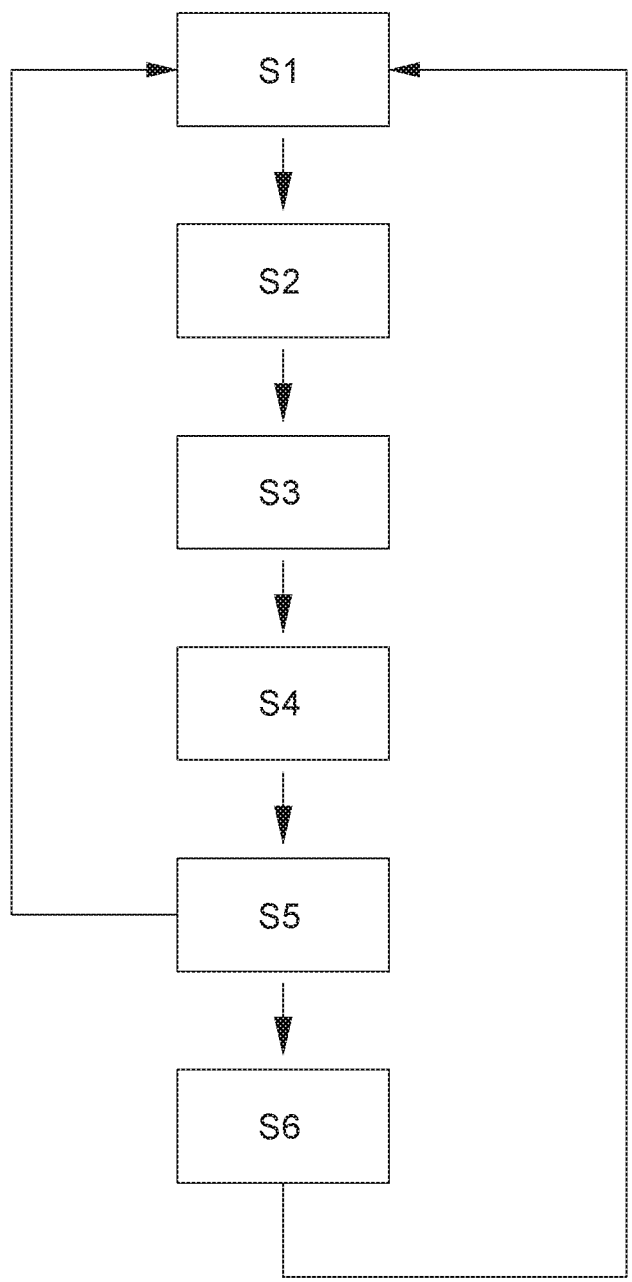
FIG. 3 is a schematic flow chart of a proposed method.

FIG. 3 shows a schematic flow chart of the proposed method with a plurality of, here six, method steps.

The individual method steps S1-S6 can in principle be implemented independently of each other, but also in any sequence and/or combination.

In the optional first method step S1, preferably a calibration of the kitchen machine 1, in particular of the heating system 20H and/or the heating element 20E, is carried out, in particular for subsequently and/or in the following method steps S2-S6 determining the heating temperature HT on the basis of the resistance R of the heating element 20E—exclusively or without the use of the temperature element 20T—or being able to use the heating element 20E as a resistance thermometer.

The first method step S1 and/or the calibration is preferably carried out self-actingly and/or automatically, in particular after starting the kitchen machine 1 and/or the heating system 20H. In this way, an always precise and/or reliable identification of critical heating states HA is enabled or supported.

The calibration is preferably carried out by means of a predefined heating process and/or calibration process, for example in which the heating system 20H delivers a predefined heat output for a certain period of time.

In and/or during the calibration, preferably the heating system 20H is activated and/or the heating element 20E is supplied with current, in particular in such a way that the heating element 20E heats up and/or the heating temperature HT increases.

In and/or for the calibration and/or during the calibration process a first electrical resistance value R1 of the heating element 20E and a heating temperature value HT1 of the heating element 20E corresponding to the first resistance value R1 are determined and/or assigned to each other, in particular as reference values. Particularly preferably, the first resistance value R1 as resistance reference value is assigned to the first heating temperature value HT1 as heating temperature reference value.

The first resistance value R1 is preferably determined by a voltage and current measurement on the heating system 20H, in particular the heating element 20E, particularly preferably by means of the measuring device 10M, especially preferably at a first time t1, and/or according to the following equation:

$$R1=U1/I1,$$

where U1 is the effective value of the voltage at time t1 in [V] and I1 is the effective value of the current at time t1 in [A].

It is preferred that in and/or for the calibration and/or during the calibration process a plurality of (different) electrical resistance values R1, R2 of the heating element 20E and corresponding heating temperature values HT1, HT2 of the heating element 20E are determined and/or assigned to each other.

Particularly preferably, a second electrical resistance value R2 of the heating element 20E and a second heating temperature value HT2 of the heating element 20E are determined with a time delay or at the second/later time t2.

The second resistance value R2 is preferably also determined by a voltage and current measurement on the heating system 20H, in particular the heating element 20E, particularly preferably by means of the measuring device 10M, especially preferably at a second time t2 and/or according to the following equation:

$$R2=U2/I2,$$

where U2 is the effective value of the voltage at time t2 in [V] and I2 is the effective value of the current at time t2 in [A].

Using the reference values and/or pairs of values, in particular the first resistance value R1, the first heating temperature value HT1, the second resistance value R2 and the second heating temperature value HT2, the temperature coefficient TCR of the heating element 20E is preferably determined and/or estimated, in particular according to the following equation:

$$TCR=[(R2/R1)-1]/(HT2-HT1).$$

As already explained, the heating temperature values HT1 and/or HT2 are determined for calibration preferably by means of the temperature element 20T.

Since the temperature element 20T is not directly arranged at the heating element 20E, the measuring temperature MT determined by the temperature element 20T does not equal the heating temperature HT of the heating element 20E.

Figure 4:
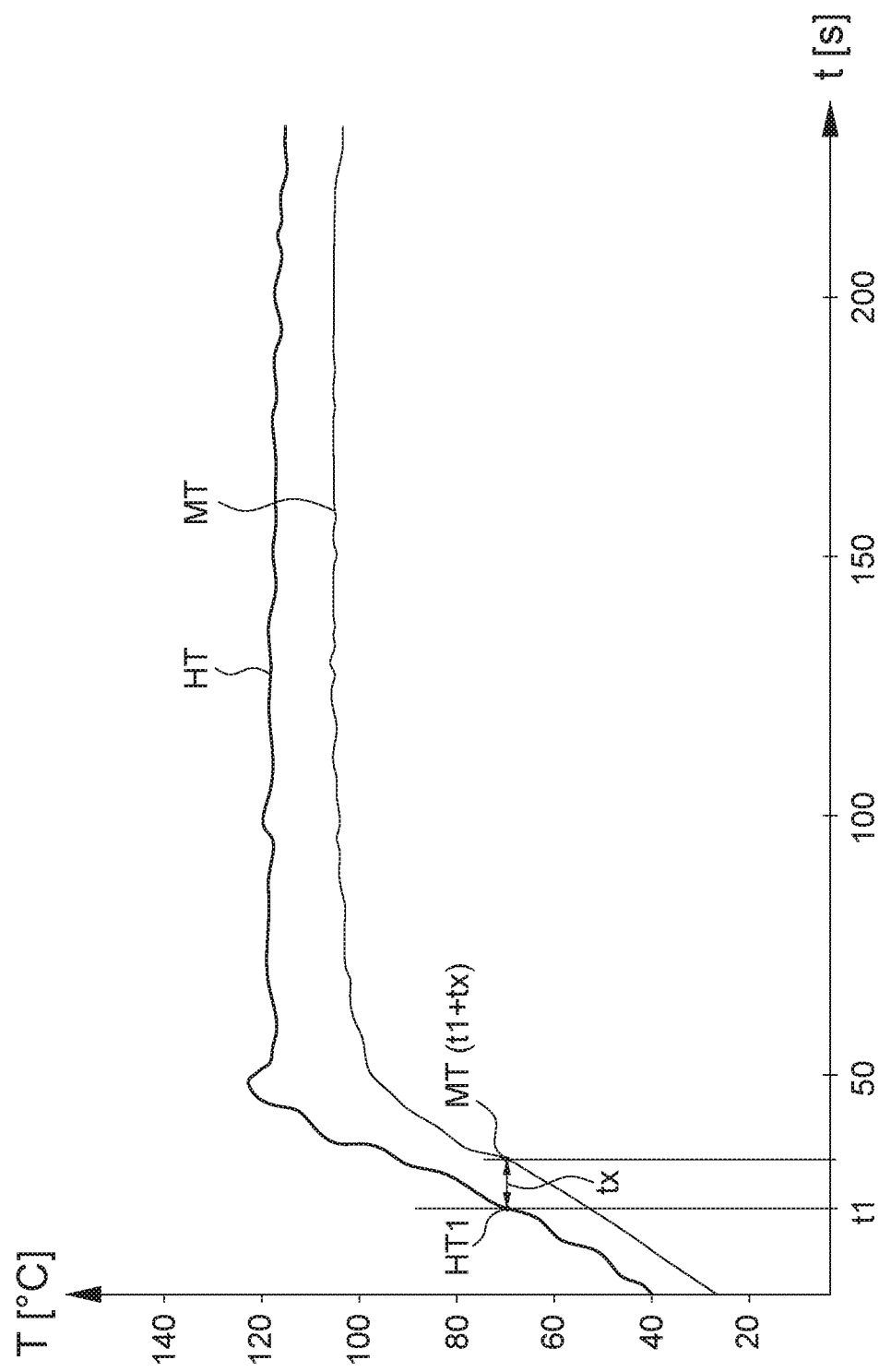
FIG. 4 is a schematic diagram with an exemplary course of a heating temperature and measuring temperature of the heating system when heating water.

As for example the course of the heating temperature HT and the measuring temperature MT in the diagram according to FIG. 4 illustrates, the heating temperature HT is higher than the measuring temperature MT during the usual heating process and/or the heating temperature HT precedes the measuring temperature MT during the heating-up phase, which in FIG. 4 lasts for about the first 50 seconds.

Against this background, the measuring temperature MT determined by means of the temperature element 20T is preferably converted and/or corrected by an in particular empirically determined value in order to determine the heating temperature HT.

Preferably—at least during the heating-up phase—the measuring temperature MT corresponds to a heating temperature HT that occurred in the past. In particular, the heating temperature value HT1=HT(t1) at time t1 corresponds to the measuring temperature value MT(t1+tx) at a later time t1+tx, as shown in FIG. 4. Thus, for determining the heating temperature HT—at least during the heating-up phase—the measuring temperature MT can be corrected by a characteristic time constant tx, in particular according to the following equation:

$$HT1=MT(t1+tx),$$

with tx as a characteristic, preferably empirically determined time constant in [s].

Alternatively, it is possible to correct the measuring temperature MT by a predefined, preferably empirically determined temperature constant Tx, in particular according to the following equation:

$$HT=MT+Tx,$$

with Tx as a characteristic, preferably empirically determined temperature constant in [° C.].

In other words, in the calibration, a time-shifted/corrected measuring temperature value MT(t1+tx) and/or MT(t2+tx) is preferably assigned to the resistance value R1 and/or R2.

The values required for calibration and/or device-specific values, in particular the characteristic/device-specific time constant tx and/or the characteristic/device-specific temperature constant Tx, and/or the values determined by calibration, in particular the resistance value(s) R1 and/or R2, the the measuring temperature value(s) MT(t1+tx) and/or MT(t2+tx), the heating temperature value(s) HT1 and/or HT2 and/or the temperature coefficient TCR are preferably stored or deposited electronically or in terms of data in the kitchen machine 1, in particular the data processing device 10R, and/or an external device.

Calibration is preferably carried out before, in particular not during a preparation process and/or the preparation of food, and/or under (always) constant conditions, in particular so that different foods and/or preparation processes do not affect calibration.

However, it is in principle also possible to carry out calibration during a preparation process and/or during the preparation of food, for example by means of a defined heating interruption or a predefined calibration recipe. In particular, in the first method step S1 and/or for calibration, a defined quantity of water, for example 100 ml, may be heated with a defined (heat) output and/or to a defined temperature.

As explained above, the proposed method allows for a device-specific calibration of the heating system 20H and/or the kitchen machine 1 on site and/or by a user and/or independently of additional (external) measuring devices. However, it is also possible in principle that the calibration was already carried out in the delivery state of the kitchen machine 1 and/or the heating system 20H and/or that the above-mentioned values are already stored in the kitchen machine 1, in particular the data processing device 10R, and/or on an external device in the delivery state of the kitchen machine 1.

In a second method step S2, which can also be carried out independently, the resistance R of the heating element 20E and/or the heating temperature HT of the heating element 20E is determined, in particular by means of the measuring device 10M.

In addition, the measuring temperature MT is determined in the second method step S2, in particular by means of the temperature element 20T.

The measurement/determination of the resistance R, the heating temperature HT and/or the measuring temperature MT is preferably carried out continuously or at intervals during the heating operation of the kitchen machine 1 and/or the heating system 20H, for example once or twice per second and/or at a sampling rate of 1 Hz or 2 Hz.

The measured/determined values, in particular the resistance R, the heating temperature HT and/or the measuring temperature MT, are optionally averaged, in particular to reduce the influence of outliers.

The values determined in this way are preferably stored and/or evaluated automatically in the kitchen machine 1, in particular the data processing device 10R, and/or in an external device, such as a server.

FIG. 4 shows in a schematic diagram the normal/usual course of the heating temperature HT and the measuring temperature MT over time when heating water, thus without critical heating states HA. The diagram shows that—at least in normal/usual operation—the heating temperature HT and the measuring temperature MT run at least essentially parallel to each other and/or with the same slope, wherein the heating temperature HT is greater than the measuring temperature MT, in the present diagram by about 15° C. to 20° C.

During the heating-up phase, in the course/curve shown in FIG. 4 about 50 seconds, the heating temperature HT and the measuring temperature MT rise at least essentially evenly and/or linearly.

When the water starts boiling, the maximum temperature and/or boiling temperature of the water has been reached. Subsequently, a stationary state and/or cooking state is reached in which the heating temperature HT, in the present case at a level of about 120° C., and the measuring temperature MT, in the present case at a level of about 100° C., remain at least substantially constant.

Preferably, in a further and/or third method step S3 it is checked whether one or more predefined criteria K1-K3 are fulfilled, in particular to identify a critical heating state HA.

In particular, in a further and/or third method step S3, the heating temperature HT and the measuring temperature MT are compared with each other (directly or indirectly), preferably by a (filtered) signal comparison and/or metrologically, particularly preferably on the basis of one or more predefined criteria K1-K3.

As already explained at the beginning, a critical heating state HA can exist if there is a local temperature change, in particular a temperature increase and/or temperature decrease, of the heating element 20E compared to the other (average) temperature and/or temperature distribution of the heating element 20E.

For example, a critical heating state HA and/or a local temperature change is present when the heating temperature HT of the heating element 20E at one location differs by more than 5° C. or 10° C. compared to the immediate surroundings of this location, in particular for a period of more than one second or two seconds.

Particularly preferably, a critical heating state HA is present if one criterion K1-K3 or several criteria K1-K3 are met, in particular over a predefined period of time, for example, more than one second or two seconds.

Figure 5:
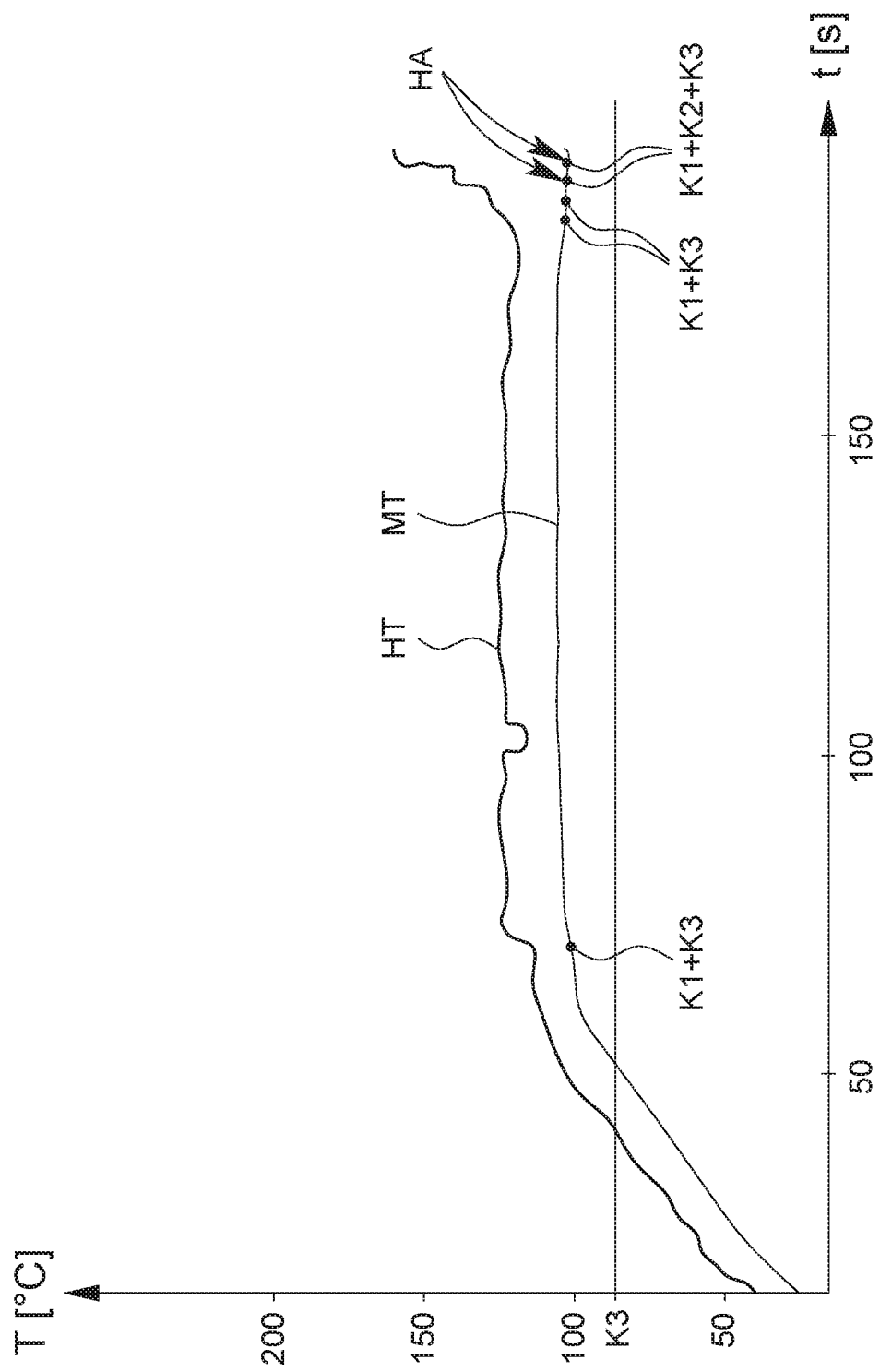
FIG. 5 is a schematic diagram with an exemplary course of the heating temperature and measuring temperature when heating water with locally dry spots on a heating plate of the heating system.
Figure 6:
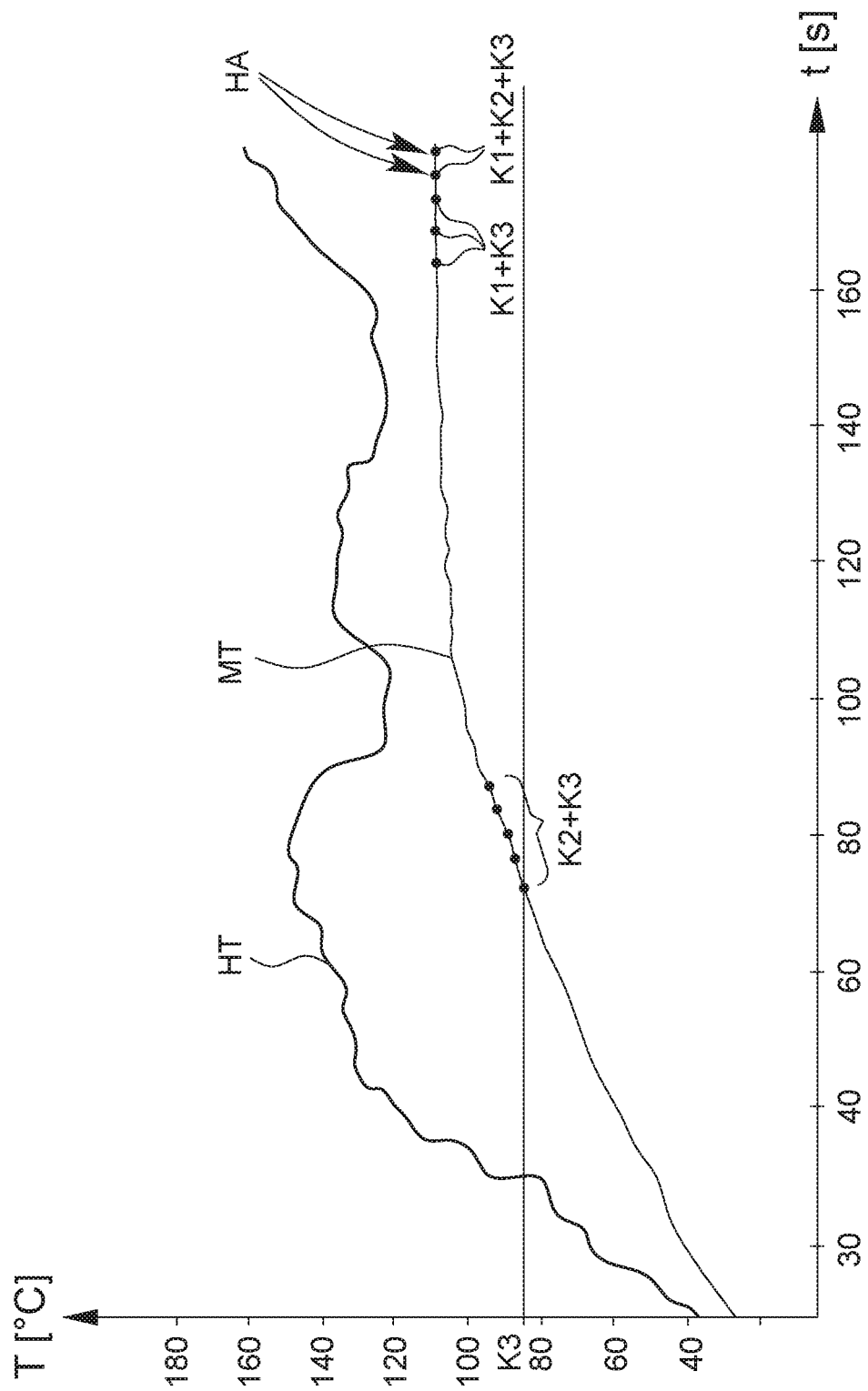
FIG. 6 is a schematic diagram with an exemplary course of the heating temperature and measuring temperature with a heating plate not completely wetted with water.
Figure 7:
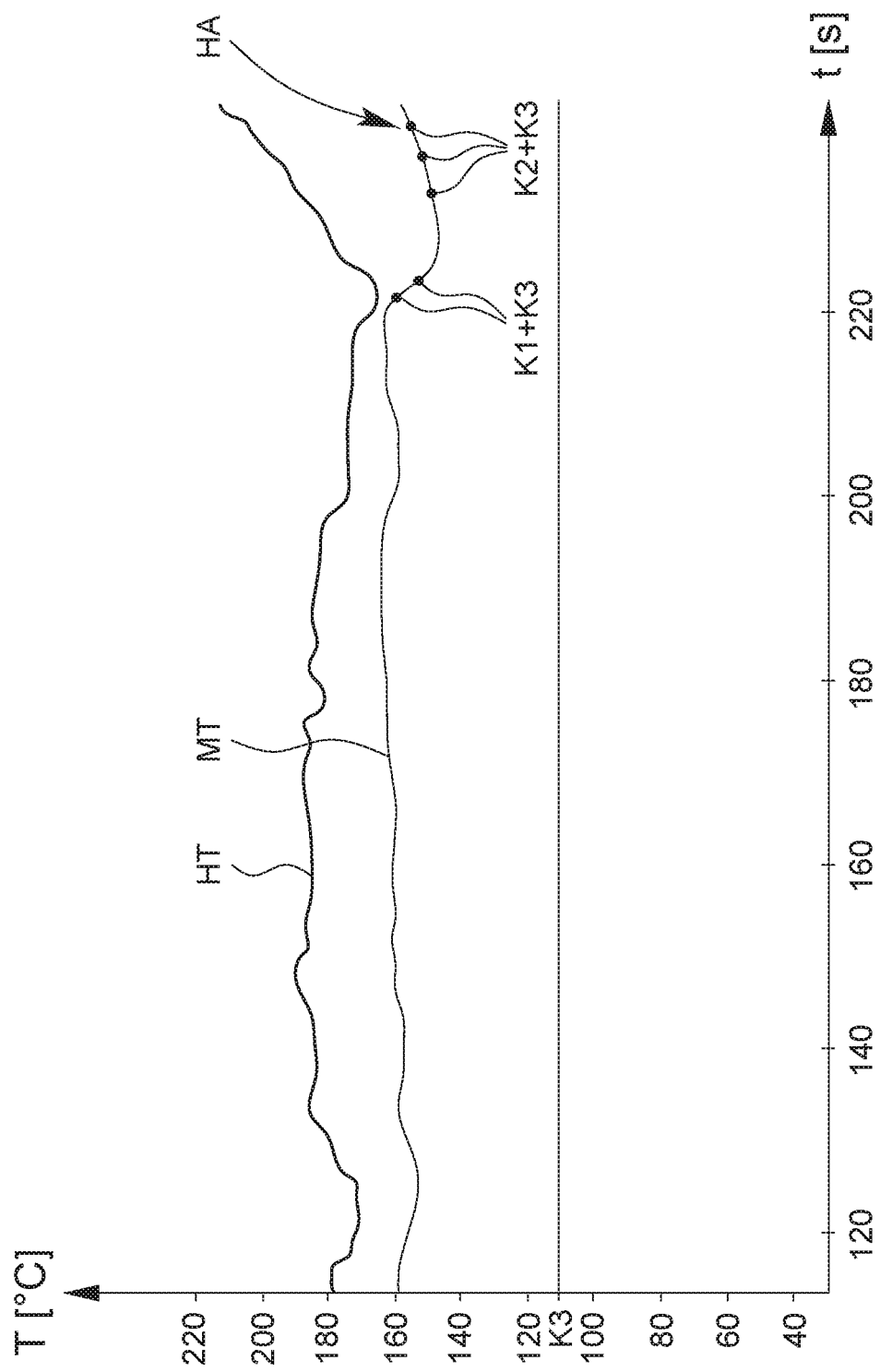
FIG. 7 is a schematic diagram with an exemplary course of the heating temperature and measuring temperature when heating inhomogeneous food.

FIG. 5 to FIG. 7 each show a schematic diagram with different curves/courses of the heating temperature HT and the measuring temperature MT, wherein at different times one, several or all criteria K1-K3 are fulfilled and critical heating states HA are present.

The first criterion K1 (gradient criterion) is preferably fulfilled when the slope/gradient of the heating temperature HT is greater than the slope/gradient of the measuring temperature MT by a predefined limit value/threshold value/critical value. In other words, for the first criterion K1, the gradient of the heating temperature HT is compared with the gradient of the measuring temperature MT and/or the difference between the gradients of the heating temperature HT and the measuring temperature MT is formed and compared with a predefined limit value, for example 2° C./s or 3° C./s.

The determination of the slope/gradient is preferably performed over a predefined period and/or sampling period, for example 2 seconds or 3 seconds.

The second criterion K2 (difference criterion) is preferably fulfilled when the heating temperature HT is greater than the measuring temperature MT by a predefined limit value/threshold value/critical value. In other words, for the second criterion K2, the difference between the heating temperature HT and the measuring temperature MT is formed and compared with a predefined limit value. If the difference between the heating temperature HT and the measuring temperature MT exceeds the predefined limit value, for example 20° C. or 40° C., the second criterion K2 is met.

The third criterion K3 (absolute temperature criterion) is fulfilled when the heating temperature HT or the measuring temperature MT (respectively) exceeds a predefined limit value/threshold value/critical value, for example 80° C. for the measuring temperature MT and/or 100° C. for the heating temperature HT. In other words, for the third criterion K3, the heating temperature HT and/or the measuring temperature MT (each) is/are compared with a predefined limit value, preferably wherein the limit value for the heating temperature HT is greater than the limit value for the measuring temperature MT.

FIG. 5 and FIG. 6 each show an exemplary curve of the heating temperature HT and the measuring temperature MT in a kitchen machine 1, in which the heating plate 20P—for example due to completely vaporizing water—has local dry areas and/or—for example due to an inclined position of the kitchen machine 1—is not completely wetted with water. The heat is dissipated less effectively in dry areas than in areas wetted with water. Consequently, the heating temperature HT of the heating element 20E, in FIG. 5 and FIG. 6 at the end of the curve, increases more than the measuring temperature MT, so that the first criterion K1 is fulfilled.

In the examples shown, a critical heating state HA is present if all three criteria K1-K3 are fulfilled.

Since at the end of the curve according to FIG. 5 and FIG. 6 the slope/gradient of the heating temperature HT is greater than the slope/gradient of the measuring temperature MT over a longer period of time (first criterion K1), the difference between the heating temperature HT and the measuring temperature MT becomes greater and greater, so that from a certain point in time the second criterion K2 is also fulfilled. Furthermore, both the heating temperature HT and the measuring temperature MT are above the predefined limit value according to the third criterion K3, in FIG. 5 and FIG. 6 of approx. 80° C. Consequently, one or more critical heating states HA can be identified at the end of the curve.

FIG. 7 shows an exemplary course/curve of the heating temperature HT and the measuring temperature MT, in which there is a local temperature reduction which can occur, for example, in the case of the preparation of inhomogeneous food and/or a recipe with individual pieces of food, for example pieces of meat, due to the local release of water.

In the illustration, the temperature element 20T is cooled locally thereby and thus the measuring temperature MT is lowered.

Since the measuring temperature MT then rises more slowly than the heating temperature HT, the second criterion K2 is fulfilled after a certain time.

As the example shows, a critical heating state HA can be present and/or identified as such if a criterion, in this case the third criterion K3 together with the first criterion K1 and/or the second criterion K2, occurs over a certain period of time, for example of about 10 seconds. In the example shown in FIG. 7, only at the end of the curve the second criterion K2 and the third criterion K3 are fulfilled over a period of about 10 seconds, which here represents a critical heating state HA.

Preferably, depending on the selected recipe and/or the food to be prepared, different limit values and/or criteria K1-K3 are used to identify a critical heating state HA. In particular, the criteria K1-K3 and/or the limit values are adapted recipe-specifically, i.e. depending on the food to be prepared and/or the operating mode of the kitchen machine 1, in particular the heating system 20H.

For example, the difference between the heating temperature HT and the measuring temperature MT is greater the higher the electrical power applied to the heating element 20E, because the heating element 20E heats up faster than the thermally slower heating plate 20P. Furthermore, food, such as water, can limit the maximum heating temperature HT and/or measuring temperature MT (cooling effect) due to the boiling temperature.

Consequently, different limit values and/or criteria K1-K3 can be specified for these cases. In particular, meaningful limit values for permissible heating states can be defined if the highest occurring difference between the heating temperature HT and the measuring temperature MT is known for the maximum possible electrical power and different foods or food classes.

If/when a critical heating state HA is identified, one or more (counter-)measures are taken and/or the operation of kitchen machine 1, in particular the heating system 20H and/or the electric motor 10E, is/are adjusted—preferably in a further and/or fourth method step S4, in particular automatically—in order to achieve a homogenization of temperatures and, for example, to prevent the food from burning.

Preferably, at/upon or (immediately) after identification of a critical heating state HA, a stirring process by means of the stirrer 20R and/or a heating process by means of the heating system 20H is carried out, started, stopped and/or adjusted, in particular in order to bring the heating temperature HT and the measuring temperature MT closer together again and/or to homogenize them.

For example, it is possible to activate the stirrer 20R and/or increase the rotational speed of the electric motor 10E at/upon or (immediately) after identification of the critical heating state HA. This is particularly effective when preparing an inhomogeneous food and/or food pieces.

In addition or alternatively, the heat output of the heating system 20H can be at least temporarily reduced and/or limited by software. In particular, it is possible to reduce the target temperature for a defined period of time and/or to switch off the heating system 20H at least temporarily and/or for a defined period of time.

In the event that a good or positive recipe result is not possible due to the critical heating state HA, for example if the critical heating state HA is present for a predefined period of time, the preparation process and/or recipe preparation can also be aborted completely.

In an optional further and/or fifth method step S5, it is preferably checked whether the measures taken and/or the adjustment of the operation (mode) of the kitchen machine 1, in particular of the heating system 20H, were successful and/or whether the heating temperature HT and the measuring temperature MT are approaching each other again.

Thus, in the fifth method step S5, a validation and/or plausibility check of the measures taken is carried out.

The validation and/or plausibility check is preferably negative and/or the measures were not successful if the heating temperature HT and the measuring temperature MT do not approach each other and/or if no homogenization of the temperatures occurs.

If, for example, despite activation of the stirrer 20R and/or deactivation of the heating system 20H, no homogenization of the heating temperature HT and the measuring temperature MT occurs and/or a critical heating state HA is still present, this may be a false alarm, for example due to incorrect calibration and/or criteria K1-K3 that are too sensitive.

In case of a false alarm, a recalibration/new calibration can preferably automatically be performed and/or the first method step S1 can be repeated.

Additionally or alternatively, it is possible to adjust and/or correct the limit values and/or criteria K1-K3, in particular to reduce sensitivity. Preferably, the adjustment of the limit values and/or criteria K1-K3 is carried out in a further and/or sixth method step S6.

For example, larger differences between the heating temperature HT and the measuring temperature MT and/or between the gradients of the heating temperature HT and the measuring temperature MT can be defined as permissible when checking the criteria K1-K3.

It is also possible that a further criterion of the criteria K1-K3 and/or several criteria K1-K3 must be fulfilled simultaneously in order for a critical heating state HA to be identified as such.

In particular in the case of repeated false alarms, it is also possible to ignore and/or switch off the comparison of the heating temperature HT and the measuring temperature MT, for example, for the current preparation process.

In a method variant, which can also be implemented independently, in addition to the measuring temperature MT determined by means of the temperature element 20T, a further measuring temperature of the heating system 20H is determined by means of a further temperature element in order to compare the heating temperature HT with a plurality of measuring temperatures for identifying the critical heating state HA.

In this way it is possible to (also) identify a local temperature change which occurs in the immediate vicinity of one of the temperature elements and thus cannot be identified by comparing the heating temperature HT with the measuring temperature of the temperature element concerned.

By means of the proposed kitchen machine 1 and/or the proposed method, temperature inhomogeneities in the kitchen machine 1 and/or in the preparation chamber ZR, for example caused by an inclined position of the kitchen machine 1, by inhomogeneous food and/or by locally dry spots on the heating plate 20P, can be identified early and/or precisely and/or safely—in particular without further aids and/or sensors—and reduced by appropriate countermeasures. In particular, damage to the kitchen machine 1, for example by burning food, can be avoided.

Individual aspects, features and method steps of the present invention can be realized independently, but also in any combination and/or sequence.

LIST OF REFERENCE SIGNS

| | |
|---|---|
| 1 | Kitchen machine |
| 10 | Base station |
| 10A | Receptacle |
| 10B | Input device |
| 10C | Power cord |
| 10D | Display device |
| 10E | Electric motor |
| 10K | Communication device |
| 10M | Measuring device |
| 10N | Power supply unit |
| 10R | Data processing device |
| 10S | Control device |
| 10U | User interface |
| 10W | Shaft |
| 10X | First electrical connection |
| 10Y | Second electrical connection |
| 20 | Vessel |
| 20A | Opening |
| 20B | Bottom |
| 20D | Lid |
| 20E | Heating element |
| 20F | Heating surface |
| 20G | Handle |
| 20H | Heating system |
| 20K | Contact surface |
| 20P | Heating plate |
| 20Q | Heating device |
| 20R | Stirrer |
| 20S | Carrier layer |
| 20T | Temperature element |
| 20W | Wall |
| 20X | First electrical connection |
| 20Y | Second electrical connection |
| A | Central axis |
| HA | Critical heating state |
| HT | Heating temperature |
| HT1 | First heating temperature value |
| HT2 | Second heating temperature value |
| I | Current |
| I1 | First current value |
| I2 | Second current value |
| K1 | First criterion |
| K2 | Second criterion |
| K3 | Third criterion |
| M1 | First measuring location |
| M2 | Second measuring location |
| MT | Measuring temperature |
| R | Resistance |
| R1 | First resistance value |
| R2 | Second resistance value |
| S1 | First method step |
| S2 | Second method step |
| S3 | Third method step |
| S4 | Fourth method step |
| S5 | Fifth method step |
| S6 | Sixth method step |
| TCR | Temperature coefficient |
| t | Time |
| t1 | First (point of) time |
| t2 | Second (point of) time |
| tx | Time constant |
| T | Temperature |
| Tx | Temperature constant |
| U | Voltage |
| U1 | First voltage value |
| U2 | Second voltage value |
| ZR | Preparation chamber |

What is claimed is:

1. A method for operating an electric heating system of a kitchen machine for processing food, comprising:
   starting the kitchen machine and activating the heating system,
   determining a heating temperature of a first area of the heating system by measuring an electrical resistance of a heating element of the heating system using a measuring device,
   determining a localized measuring temperature of a second area of the heating system using a temperature sensor, the second area being smaller than the first area, and
   comparing during the processing of the food the localized measuring temperature with the heating temperature to identify a heating state of the heating system, the heating state being a local temperature change of the heating element.

2. The method of claim 1, wherein the second area is arranged closer to a preparation chamber of the kitchen machine than the first area.

3. The method according to claim 1, wherein a calibration is carried out automatically by the temperature sensor at least one of after starting the heating system, after starting the kitchen machine or for each heating process.

4. The method according to claim 1, wherein during operation of the heating system at least one of the difference of the gradients of the heating temperature and the localized measuring temperature, the difference of the heating temperature and the localized measuring temperature, the heating temperature or the localized measuring temperature is compared with one or more limit values in order to identify the heating state of the heating system.

5. The method according to claim 4, wherein the one or more limit values are adapted recipe-specifically.

6. The method according to claim 1, wherein, upon identification of the heating state, the operation of the kitchen machine or heating system is adapted.

7. The method according to claim 1, wherein upon identification of the heating state, at least one of a stirring process or a heating process is at least one of carried out, started, ended or adapted.

8. The method according to claim 1, wherein a further localized measuring temperature of the heating system is determined by a further temperature sensor in order to compare the heating temperature with a plurality of localized measuring temperatures for identifying the heating state.

9. A method for operating an electric heating system of a kitchen machine for processing food, comprising:
  starting the kitchen machine and activating the heating system,
  determining a heating temperature of a first area of the heating system by measuring an electrical resistance of a heating element of the heating system using a measuring device,
  determining a localized measuring temperature of a second area of the heating system using a temperature sensor, the second area being smaller than the first area, and
  carrying out a calibration of the heating system by the temperature sensor during the processing of food.

10. The method according to claim 9, wherein, for calibration of the heating system, an electrical resistance value of the heating element and a heating temperature value of the heating element corresponding to the resistance value are determined as reference values.

11. The method according to claim 10, wherein the heating temperature value is determined by the temperature sensor.

12. The method according to claim 11, wherein the heating temperature value is determined by the localized measuring temperature value determined by means of the temperature sensor being converted into the heating temperature value.

13. The method according to claim 9, wherein, for calibration, a plurality of electrical resistance values of the heating element and heating temperature values of the heating element corresponding to the resistance values are determined in order to determine a temperature coefficient of the heating element.

14. The method according to claim 13, wherein the heating temperature values are determined by the temperature sensor.

15. The method according to claim 14, wherein the heating temperature values are determined by localized measuring temperature values determined by the temperature sensor being converted into the heating temperature values.

16. The method according to claim 9, wherein the calibration is carried out automatically at least one of after starting the heating system, after starting the kitchen machine or for each heating process.

17. The method according to claim 9, comparing the localized measuring temperature with the heating temperature to identify a heating state of the heating system, the heating state being a local temperature change of the heating element.

18. The method according to claim 17, wherein during operation of the heating system at least one of the difference of the gradients of the heating temperature and the localized measuring temperature, the difference of the heating temperature and the localized measuring temperature, the heating temperature or the localized measuring temperature is compared with one or more limit values in order to identify the heating state of the heating system.

* * * * *